US005667710A

United States Patent [19]
Kraemer

[11] Patent Number: 5,667,710
[45] Date of Patent: Sep. 16, 1997

[54] ELECTRICAL HEATER DEVICE FOR HEATING THE INTERIOR OF AN AUTOMOBILE

[76] Inventor: Steve Kraemer, P.O. Box 312, Oakwood, ON, Canada, K0M 2M0

[21] Appl. No.: 621,983

[22] Filed: Mar. 26, 1996

[51] Int. Cl.⁶ .................... B60L 1/02; B60H 1/02
[52] U.S. Cl. .................... 219/202; 237/12.3 B; 165/41; 219/546; 219/544; 219/510
[58] Field of Search .................... 219/202, 483, 219/494, 510, 520, 544, 546, 548; 392/370; 165/41-43; 237/12.3 R, 12.4, 12.3 B, 28, 35

[56] References Cited

U.S. PATENT DOCUMENTS

| | | |
|---|---|---|
| 3,300,619 | 1/1967 | Nilssen .................... 219/202 |
| 3,313,915 | 4/1967 | Chamberlain, Jr. .................... 219/202 |
| 3,870,855 | 3/1975 | Edlund et al. .................... 219/202 |
| 4,335,849 | 6/1982 | Bashuysen .................... 237/12.3 R |
| 4,423,307 | 12/1983 | Kondo et al. .................... 219/202 |
| 5,115,116 | 5/1992 | Reed .................... 219/202 |

Primary Examiner—Teresa J. Walberg
Assistant Examiner—Raphael Valencia

[57] ABSTRACT

A electrical heater device for heating the interior of an automobile including a housing that is mounted to an automobile heater core. The housing has a top plate with an interior surface, a bottom plate and a pair of side plates. The housing has a first electrical wire that is positioned on the interior surface and is capable of extending along one of the side plates. The housing has a second electrical wire that is in series within the housing and coupled with the first wire at a housing wire end. Included is a plurality of heating coils that are positioned along the second electrical wire. Also, included is a switch mechanism that has a knob and a contact casing with a contact wire end of the first wire therein. The casing has a third electrical wire with a switching end and is coupled to a battery of the automobile. The knob allows an electrical bridge to form for transmission of an electric current to pass into the wire for charging of the plurality of heating coils. Lastly, a temperature sensor, for disruption of a contact relay, is included.

2 Claims, 3 Drawing Sheets

HEATER ASSEMBLY CORE

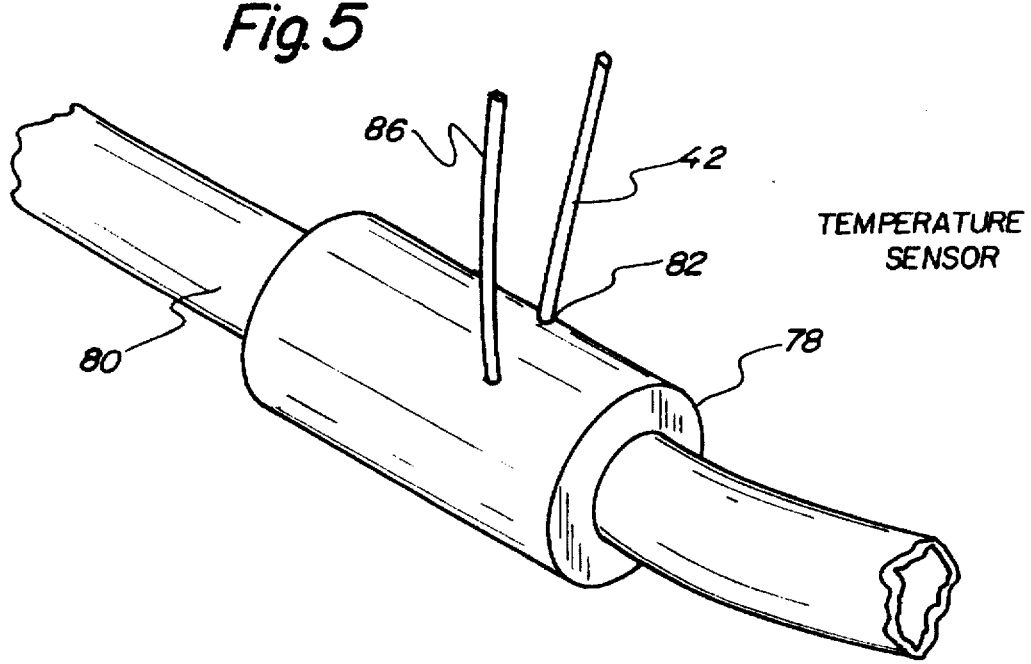
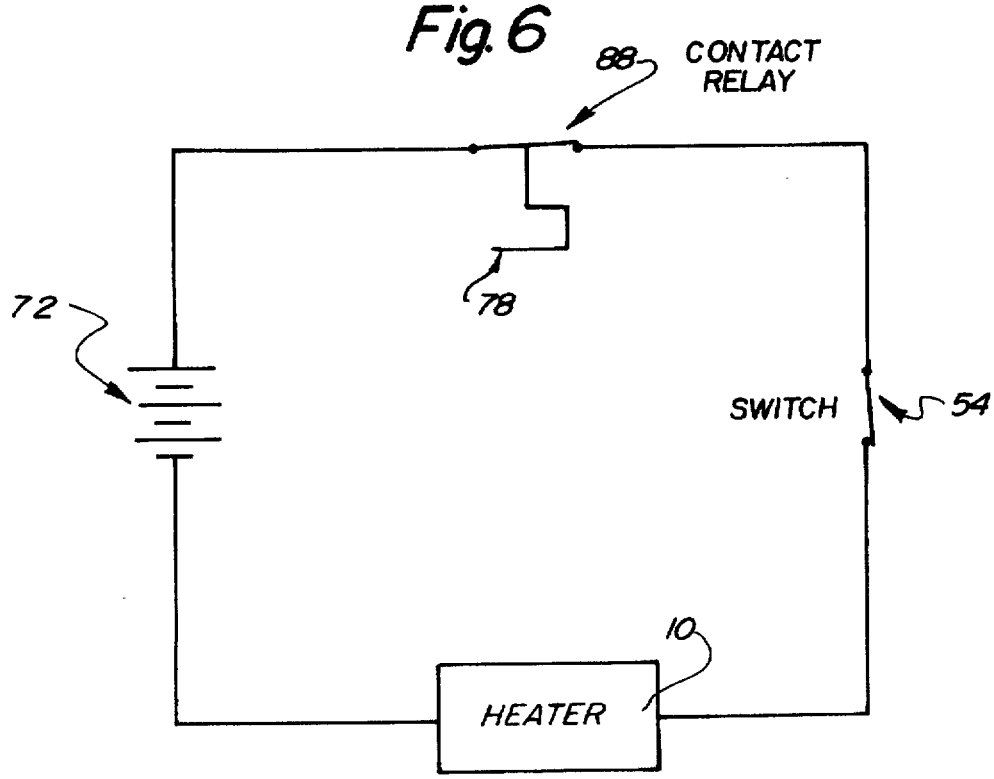

ELECTRICAL HEATER DEVICE FOR HEATING THE INTERIOR OF AN AUTOMOBILE

BACKGROUND OF THE INVENTION

1. Field of the Invention

The present invention relates to a electrical heater device for heating the interior of an automobile and more particularly pertains to heating the interior of an automobile prior to the main heating core assembly rising to a temperature where it may be used to raise the temperature of the interior of the automobile, and further providing a temperature sensor which allows the device to be turned off automatically when the main heating core assembly reaches such a temperature.

2. Description of the Prior Art

The use of interior heating system for an automobile is known in the prior art. More specifically, interior heating system for an automobile heretofore devised and utilized for the purpose of heating the interior of an automobile is known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,713,522 to Kimura discloses an electrical heating appliance detachably mounted in a motor vehicle. U.S. Pat. No. 4,591,691 to Babali discloses an auxiliary electric heating system for internal combustion engine powered vehicles. U.S. Pat. No. 4,520,258 to Trohmann discloses a system concomitantly controlling passenger compartment and electrical auxiliary heating in automatic vehicles. U.S. Pat. No. 4,293,759 to Higgins discloses an electric heating system for heating the interior of a motor vehicle prior to starting. U.S. Pat. No. 3,870,855 to Edlund and Wiksterom discloses an electric heating and battery charging system for motor vehicles. Lastly, U.S. Pat. No. 3,469,072 to Carlson discloses an electric heating system for motor vehicles.

While these devices fulfill their respective, particular objectives and requirements, the aforementioned patents do not describe electrical heater device for heating the interior of an automobile that allows heating of the interior portion of an automobile compartment while waiting for the main heating core assembly to provide the heat and structured to attach to the main heating core assembly of the automobile.

In this respect, the electrical heater device for heating the interior of an automobile according to the present invention substantially departs from the conventional concepts and designs of the prior art, and in doing so provides an apparatus primarily developed for the purpose of heating the interior of an automobile prior to the main heating core assembly increasing the temperature of the interior of the automobile, and further providing a temperature sensor which allows the device to be turned off automatically.

Therefore, it can be appreciated that there exists a continuing need for a new and improved electrical heater device for heating the interior of an automobile which can be used for heating the interior of an automobile prior to the main heating core assembly increasing the temperature of the interior of the automobile, and further providing a temperature sensor which allows the device to be turned off automatically. In this regard, the present invention substantially fulfills this need.

SUMMARY OF THE INVENTION

In view of the foregoing disadvantages inherent in the known types of interior heating system for an automobile now present in the prior art, the present invention provides an improved electrical heater device for heating the interior of an automobile. As such, the general purpose of the present invention, which will be described subsequently in greater detail, is to provide a new and improved electrical heater device for heating the interior of an automobile and method which has all the advantages of the prior art and none of the disadvantages.

To attain this, the present invention essentially is comprised of a generally rectangular housing which is included. The housing has a plate top, a bottom plate and a pair of side plates therebetween. The housing has a length of about eight inches, a height of about six inches and a width that is about one-half inch depending on the size of the heater core of which it will be filtered. The housing is fixedly mounted to a heater core assembly of an automobile. The housing is mounted to the rear of the heater core assembly. The housing has a first electrical wire positioned on an interior surface of the top plate. The first wire enters the housing through an exterior surface of the top plate and extends along an interior surface of one of the side plates. The first wire has a housing wire end that is spaced from an attaching position of the bottom and one of the side plates. The housing has a second electrical wire that is positionable within the housing in a continuous series. The second wire enters housing through the exterior surface of the top plate adjacent the first wire. The second wire is capable of coupling with the first wire at the housing wire end. Also, included is a plurality of heating coils. The heating coils are positioned along the second electrical wire when the second wire is contained within the housing. Each heating coil may be heated to a temperature of above seventy degrees celsius. Additionally, a switch mechanism that has a knob and a contact casing is included. The switch mechanism is positioned within the interior of the automobile and can be reached by the driver. The contact casing has a contact wire end of the first wire therein. The contact casing has a third electrical wire with a switching end therein. The third electrical wire has a length for extending from the switch mechanism into the engine area of the automobile for coupling with the electrical supply of the automobile. The switch mechanism is operated by pushing the knob. Pushing the knob allows an electrical bridge to form between the contact end of the first wire and the switching end of the third wire. The electrical boost transmits an electrical current through and into the first wire for charging the plurality of heating coils of the second wire within the housing. Lastly, a generally cylindrical temperature sensor is provided. The sensor is positioned around a fluid line of the heater coil assembly of the automobile. The temperature sensor of the second wire therein. The sensor is capable of receiving a fourth electrical wire that extends from the battery. The fourth electrical wire and the second wire form a contact relay within the temperature sensor. The contact relay is capable of being disrupted when the temperature sensor responds to the fluid line reaching a temperature of about seventy degrees celsius. The contact relay, when disrupted, causes the heating coil to lose current causing the switch mechanism to disengage.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical heater device for heating the interior of an automobile which has all of the advantages of the prior art interior heating system for an automobile and none of the disadvantages.

It is another object of the present invention to provide a new and improved electrical heater device for heating the interior of an automobile which may be easily and efficiently manufactured and marketed.

It is further object of the present invention to provide a new and improved electrical heater device for heating the interior of an automobile which is of durable and reliable constructions.

An even further object of the present invention is to provide a new and improved electrical heater device for heating the interior of an automobile which is susceptible of a low cost of manufacture with regard to both materials and labor, and which accordingly is then susceptible of low prices of sale to the consuming public, thereby making such electrical heater device for heating the interior of an automobile economically available to the buying public.

Still yet another object of the present invention is to provide a new and improved electrical heater device for heating the interior of an automobile which provides in the apparatuses and methods of the prior art some of the advantages thereof, while simultaneously overcoming some of the disadvantages normally associated therewith.

Even still another object of the present invention is to provide a electrical heater device for heating the interior of an automobile prior to the main heating core assembly becoming sufficiently hot to increase the temperature of the interior of the automobile, and further providing a temperature sensor which allows the device to be turned off automatically.

Lastly, it is an object of the present invention to provide a new and improved electrical heater device for heating the interior of an automobile including a housing that is mounted to an automobile heater core. The housing has a top plate with an interior surface, a bottom plate and a pair of side plates therebetween. The housing has a first electrical wire that is positioned on the interior surface and is capable of extending along one of the side plates. The housing has a second electrical wire that is in a continuous series within the housing. The second wire is capable of coupling with the first wire at a housing wire end. Included is a plurality of heating coils that are positioned along the second electrical wire. Also, included is a switch mechanism that has a knob and a contact casing with a contact wire end of the first wire therein. The casing has a third electrical wire with a switching end and is capable of coupling with the electrical system of the automobile. The knob allows an electrical bridge to form that is capable to transmission of an electric current to pass into the wire for charging of the plurality of heating coils of the second wire. Lastly, a temperature sensor, for disruption of a contact relay, is included. The sensor has a sensor end of the second wire therein and is capable of receiving a fourth electrical wire that extends from the battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged view of the temperature sensor of the present invention.

FIG. 6 is a schematic view of the path of the electrical current of the present invention.

The same reference numerals refer to the same parts through the various Figures.

DESCRIPTION OF THE PREFERRED EMBODIMENT

Figure 1:
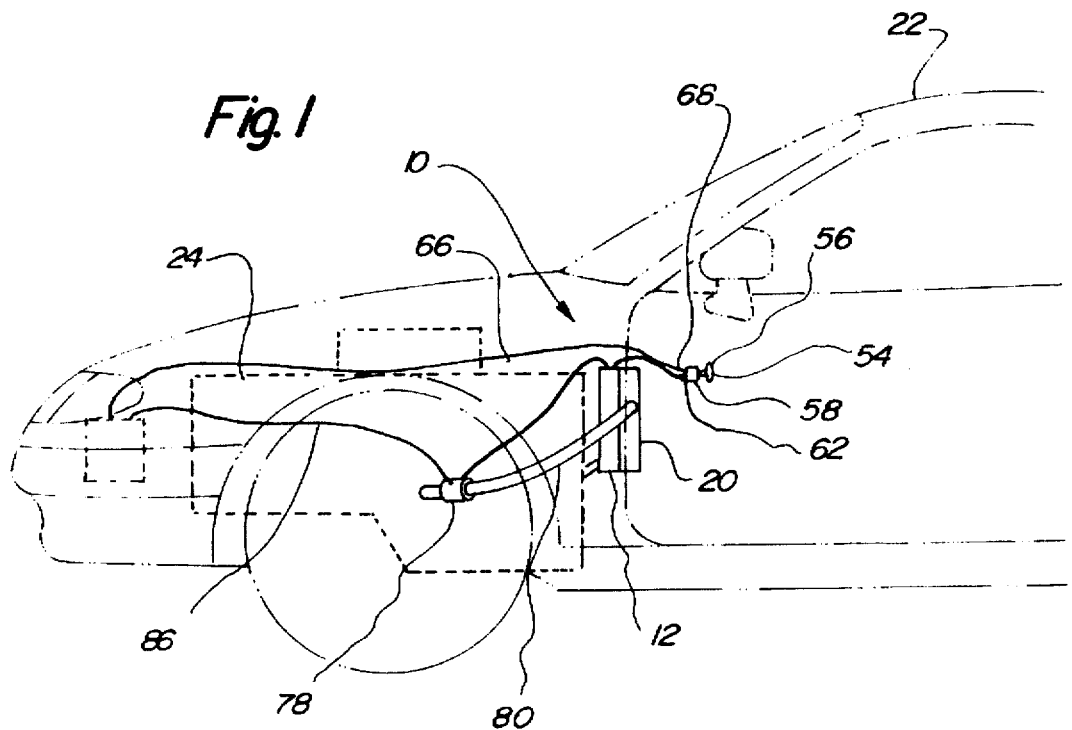
FIG. 1 is a perspective view of the preferred embodiment of the electrical heater device for heating the interior of an automobile constructed in accordance with the principles of the present invention.

With reference now to the drawings, and in particular to FIG. 1 thereof, the preferred embodiment of the new and improved electrical heater device for heating the interior of an automobile embodying the principles and concepts of the present invention and generally designated by the reference numeral 10 will be described.

The present invention, the electrical heater device for heating the interior of an automobile 10 is comprised of a plurality of components. Such components in their broadest context include a housing, heating coils, a switch mechanism and a temperature sensor. Such components are individually configured and correlated with respect to each other so as to attain the desired objective.

Figure 2:
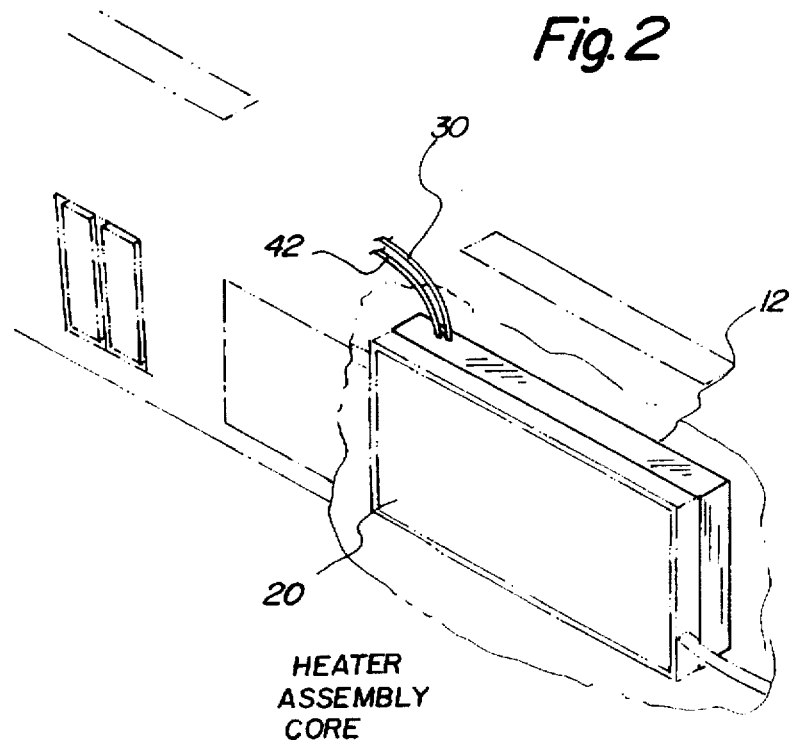
FIG. 2 is an isometric view of the device being attached to the heating core assembly.

Specifically, the present invention includes a generally rectangular housing 12. The housing is formed of a metal alloy that has a good tolerance for high temperatures. The housing has a plate top 14, a bottom plate 16 and a pair of side plates 18 therebetween. The housing has a length of about eight inches, a height of about six inches and a width being about one-half inch. The housing is capable of being fixedly mounted to a heater core assembly 20 of an automobile 22. As shown in FIG. 2, the sides of the housing allows the housing to be mounted to the rear of the heater core assembly. The housing when attached to the heater core assembly of the automobile is spaced from the an engine 24 of the automobile, as illustrated in FIG. 1.

Figure 3:
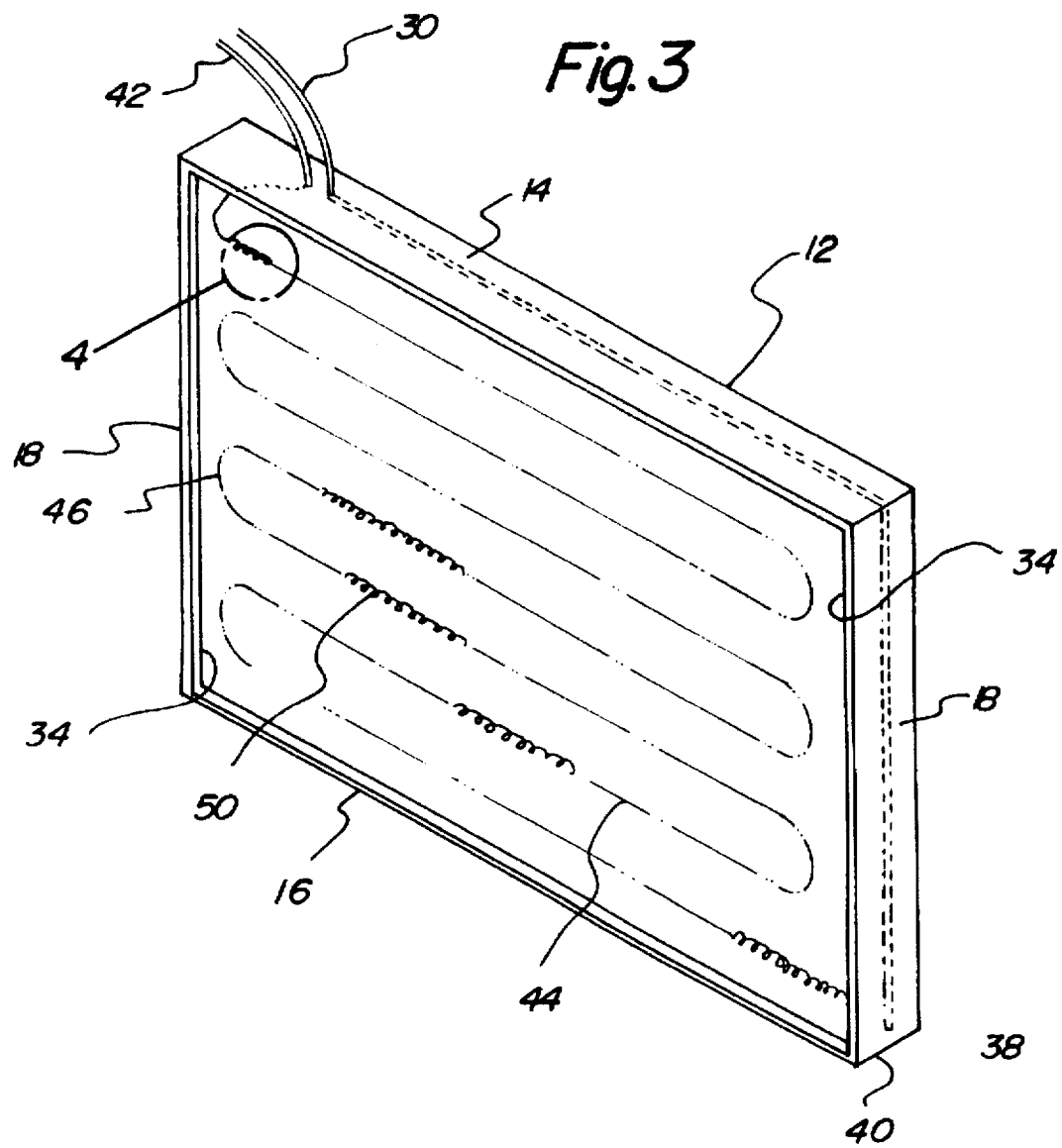
FIG. 3 is an enlarged isometric view of the present invention in an operable configuration.

The housing 12 has a first electrical wire 30 positioned on an interior surface 32 of the top plate 14. As shown in shown in FIG. 3, the first wire enters the housing through an exterior surface of the top plate. The first wire continues along the top plate and extends along an interior surface 34 of one of the side plates 18. The first wire has a housing wire end 38 spaced from an attaching position 40 of the bottom plate and one of the side plates 18. Additionally, the housing has a second electrical wire 42 positionable therein. The second electrical wire is positioned in a continuous series within the housing. The second wire forms a plurality of linear portions 44 along a horizontal axis within the housing. The end of several of the linear portions have a loop 46 formed thereon before each linear portion continues within the housing along the parallel axis in a vertical plan. The second wire enters the housing through the exterior surface of the top plate adjacent the first wire 30. The second wire is capable of coupling with the first wire at the housing wire end.

Figure 4:
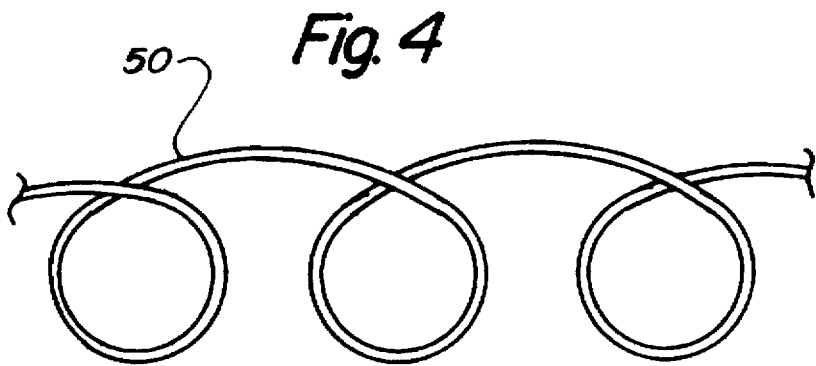
FIG. 4 is an enlarged view of the heating coil shown at position 4 of FIG. 3.

As best illustrated in FIG. 4, a plurality of heating coils 60 are provided. The plurality of heating coils are positioned along the second electrical wire when the second wire 42 is contained within the housing. The coils are randomly spaced along the second wire. Each coil is capable of emitting temperatures above seventy degrees celsius. The temperatures emitted from the coils are capable of heating the interior of the automobile.

A switch mechanism 54, a shown in FIG. 1, is included. The switch mechanism has a knob 56 and a contact casing 58. The switch mechanism of FIG. 1, is positioned within the interior of the automobile, and within the reach of a driver. The contact casing and the knob of the switch mechanism are formed of a rigid plastic. The contact casing has a contact wire end 62 of the first wire 30 therein. The contact casing has a third electrical wire 66 with a switching end 68 contained therein. The third electrical wire has a length for extending from the switch mechanism into as engine area of the automobile for coupling with a battery 72 of the automobile.

The switch mechanism 54 is operated by pushing in the knob. When the switch is engaged, the switch allows an electrical bridge to form between the contact end 52 of the first wire 30 and the switching end 68 of the third wire 66. The electrical bridge transmits an electrical current through the third wire and into the first wire for charging of the plurality of heating coils 50 of the second wire within the housing. The heating coils, once charged convert the electrical current into heat.

Lastly, a generally cylindrical temperature sensor 78 is provided. As shown in FIG. 1, the sensor is positionable around a fluid line 80 of the heater coil assembly 20 of the automobile 22. The temperature sensor has a sensor end 82 of the second wire 42 therein. The sensor is capable of receiving a fourth electrical wire 86 that extends from the sensor to the battery 72. The fourth electrical wire and the second wire form a contact relay 88 within the temperature sensor, as shown in FIG. 6. The temperature sensor is any standard sensor that is used in automobiles. The contact relay is capable of being disrupted when the temperature sensor responds to the fluid line emitting a temperature of about seventy degrees celsius or above. Disruption of the contact relay will cause the heating coil to lose current which in turn will cause the switch mechanism to disengage or pop out. By having the sensor line the driver will not have to remember to turn off the electrical heater device once the main heating system has completely warmed up.

The present invention is an electrical heater device for heating the interior of an automobile that may be attached to existing heater core assembly of the automobile. The device will assist in heating of the interior passenger compartment of the automobile while the driver is waiting for the heater core assembly to provide sufficient heat. The device is powered directly by the electrical supply (alternator/generator) of the automobile which allows it to come on readily when the button is pushed. The device is mounted to the heating core assembly with brackets so that its securely attached to the existing heating core assembly. The device has a temperature sensor which is wrapped around the fluid line of the heating core assembly. This temperature sensor is designed to react to an increase in temperature that is emitted from the fluid line. The increase in temperature will automatically cause the sensor to disrupt the current flow that is coming from the battery which in turn causes disruption of the current flow into the electrical heater device. Disruption of the current flow will cause the button to disengage which will turn the device off. The device allows the interior portion of the automobile to be heated at a faster rate while waiting for the fluid to flow through the engine and begin to heat the existing heating core assembly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electrical heater device for heating the interior of an automobile attachable to existing heating core assembly comprising in combination:

a generally rectangular housing having a top plate, a bottom plate and a pair of side plates therebetween, the housing capable of being fixedly mounted to a heater core assembly of an automobile, the housing being mounted to the rear of the heater core assembly and spaced from an engine of the automobile;

the housing having positioned on an interior surface of the top plate a first electrical wire, the first wire entering the housing through an exterior surface of the top plate and capable of extending along an interior surface of one of the side plates, the first wire having a housing wire end spaced from an attaching position of the bottom plate and one of the side plates, the housing having positioned therein a second electrical wire being positionable in a continuous series within the housing, the second wire entering the housing through the exterior surface of the top plate adjacent the first wire, the second wire being capable of coupling with the first wire at the housing wire end;

a plurality of heating coils being positionable along the second electrical wire when the second wire being contained within the housing, each heating coil being capable of emitting temperatures above 70 degrees Celsius;

a switch mechanism having a knob and a contact casing, the switch mechanism being positionable within the interior of the automobile within the reach of a driver, the contact casing having a contact wire end of the first wire therein, the contact casing having a third electrical wire with a switching end therein, the third electrical wire having a length for extending from the switch mechanism into an engine area of the automobile for coupling with a battery of the automobile;

the switch mechanism capable of being pushed at the knob for allowing an electrical bridge to form between the contact end of the first wire and the switching end of the third wire, the electrical bridge being capable of transmission of an electrical current to pass therethrough, and into the first wire for charging of the plurality of heating coils of the second wire within the housing; and a generally cylindrical temperature sensor being positionable around a fluid line of the heater core assembly of the automobile, the temperature sensor having a sensor end of the second wire therein, the sensor capable of receiving a fourth electrical wire extending from the battery, the fourth electrical wire and the second electrical wire form a contact relay within the temperature sensor, the contact relay capable of being disrupted when the temperature sensor responding to the fluid line emitting a temperature of about 70 degrees Celsius, the contact relay being disrupted being capable of causing the heating coils to lose current causing the switch mechanism to disengage.

2. The electrical heating device for heating the interior of an automobile comprising:

a housing mounted to an automobile heater core having a top plate with an interior surface, a bottom plate and a pair of side plates therebetween, the housing having a length being about 8 inches, a height being about 6 inches and a width being about ½ inch, the housing having a first electrical wire being positioned on the interior surface and being capable of extending along of one of the side plates, the housing having a second electrical wire being in a continuous series within the housing, the second wire being capable of coupling with the first wire at a housing wire end;

a plurality of heating coils being positioned along the second electrical wire, the plurality of heating coils being capable of emitting temperatures above 70 degrees Celsius when the second wire being contained within the housing and coupled to the housing wire end of the first wire;

a switch mechanism having a knob and a contact casing with a contact wire end of the first wire therein, the casing having a third electrical wire with a switching end and capable of coupling with a battery of the automobile, the knob allowing an electrical bridge to form and being capable of transmission of an electrical current to pass into the first wire for charging of the plurality of heating coils of the second wire; and a temperature sensor for disruption of a contact relay, and having a sensor end of the second wire therein, and being capable of receiving a fourth electrical wire extending from the battery, the temperature sensor being cylindrical and positionable around a fluid line of the heater core assembly of the automobile, and the fourth electrical wire therein and the second electrical wire form a contact relay within the temperature sensor, the contact relay capable of being disrupted when the temperature sensor responding to the fluid line emitting a temperature of about 70 degrees Celsius, the contact relay being disrupted being capable of causing the heating coils to lose current causing the switch mechanism to disengage.

\* \* \* \* \*